(12) United States Patent
Bergmann et al.

(10) Patent No.: US 10,146,106 B1
(45) Date of Patent: Dec. 4, 2018

(54) CAMERA POLE

(71) Applicants: Brian Bergmann, Saratoga Springs, UT (US); Branden Reall, Eagle Mountain, UT (US)

(72) Inventors: Brian Bergmann, Saratoga Springs, UT (US); Branden Reall, Eagle Mountain, UT (US)

(*) Notice: Subject to any disclaimer, the term of this patent is extended or adjusted under 35 U.S.C. 154(b) by 0 days.

(21) Appl. No.: 14/967,273

(22) Filed: Dec. 12, 2015

Related U.S. Application Data

(60) Provisional application No. 62/091,539, filed on Dec. 14, 2014.

(51) Int. Cl.
*G03B 17/56* (2006.01)

(52) U.S. Cl.
CPC .................................. *G03B 17/561* (2013.01)

(58) Field of Classification Search
CPC ...... F16M 11/18; F16M 11/28; F16M 11/245; F16M 11/2014; F16M 11/10; F16M 2200/08; E04H 12/182
See application file for complete search history.

(56) References Cited

U.S. PATENT DOCUMENTS

| | | | | |
|---|---|---|---|---|
| 4,356,637 A * | 11/1982 | Hall | ..................... | F16M 11/045 33/296 |
| 5,786,854 A * | 7/1998 | Slade | ..................... | F16M 11/18 348/373 |
| 5,860,944 A * | 1/1999 | Hoffman, Jr. | ........... | A61F 5/026 2/44 |
| 6,932,305 B2 * | 8/2005 | Morales | ................ | F16M 11/10 248/125.2 |
| 2002/0168188 A1* | 11/2002 | Fix | ........................ | B66F 11/048 396/419 |
| 2003/0161622 A1* | 8/2003 | Zantos | .................. | E04H 12/182 396/419 |
| 2010/0155549 A1* | 6/2010 | Robinson | ............... | F16M 11/10 248/183.1 |
| 2013/0287386 A1* | 10/2013 | Xu | ....................... | F16M 11/041 396/428 |

* cited by examiner

*Primary Examiner* — Noam Reisner
(74) *Attorney, Agent, or Firm* — John J. Elnitski, Jr.

(57) ABSTRACT

A camera pole for elevating and controlling a camera. A pole having a base section and a least one telescoping section which extends from the base section. Where a final telescoping section is a top section that is highest and the base section is closest to ground level. A stand to receive the pole and support the pole. A camera control assembly comprising an upper pulley rotatably attached to the top section of the pole; a lower pulley rotatably attached to the pole near the base section; a cable about the upper pulley and the lower pulley; an adjustable section as part of the cable, where the length of the cable can adjusted using the adjustable section; and a handle attached to the lower pulley to rotate the lower pulley, thereby rotating the upper pulley. A camera mount for holding a camera, the camera mount attached to the lower pulley.

17 Claims, 25 Drawing Sheets

CAMERA POLE

This application claims the benefit and incorporates by reference U.S. Provisional Application No. 62/091,539, filed Dec. 14, 2014.

BACKGROUND

The present invention generally relates to the production of elevating cameras to film at a higher angle. More specifically, the present invention relates to camera poles for elevating a camera to a height in the range of 10 to 40 feet in the air and controlling a camera.

Filming of players in team sports such as football and soccer have become more prevalent for the high school age players and younger. It allows for an aid for coaching, as well as for parents to record their child's play at games and practices. A majority of the time, filming cannot be performed at the height necessary due to the lack of a stadium. Many playing fields during practice and games are view from ground level. There are camera poles on the market, but the expense of the available camera pole is in the thousands of dollars, which cannot be afforded by smaller sports programs or individual parents. What is needed is a simplified product that can elevate and control a camera, yet break the high cost barrier imposed by current units.

It is an object of the present invention to provide a simplified camera pole for elevating a camera to film from a higher angle.

SUMMARY

A camera pole for elevating and controlling a camera. A pole having a base section and a least one telescoping section which extends from the base section. Where a final telescoping section is a top section that is highest and the base section is closest to ground level. A stand to receive the pole and support the pole. A camera control assembly comprising an upper pulley rotatably attached to the top section of the pole; a lower pulley rotatably attached to the pole near the base section; a cable about the upper pulley and the lower pulley; an adjustable section as part of the cable, where the length of the cable can adjusted using the adjustable section; and a handle attached to the lower pulley to rotate the lower pulley, thereby rotating the upper pulley. A camera mount for holding a camera, the camera mount attached to the lower pulley.

DETAILED DESCRIPTION OF THE INVENTION

Figure 1:
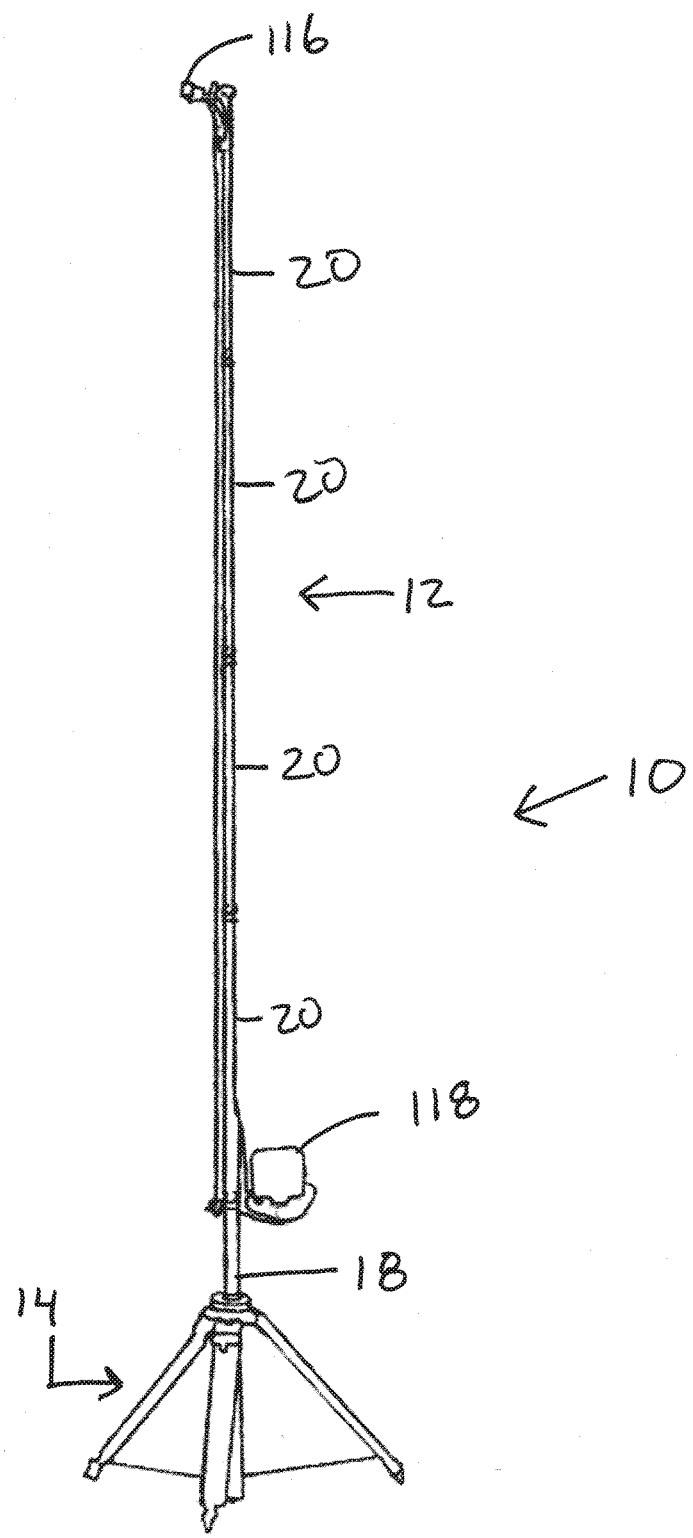
FIG. 1 is a perspective view of a camera pole assembly according to the present invention.

The present invention is a camera pole assembly for elevating a camera to a height in the range of 10 to 40 feet in the air and controlling a camera. FIG. 1 shows the assembled camera pole assembly 10 deployed. The camera pole assembly includes a pole 12, stand 14, camera control assembly and camera mount 16.

Figure 2:
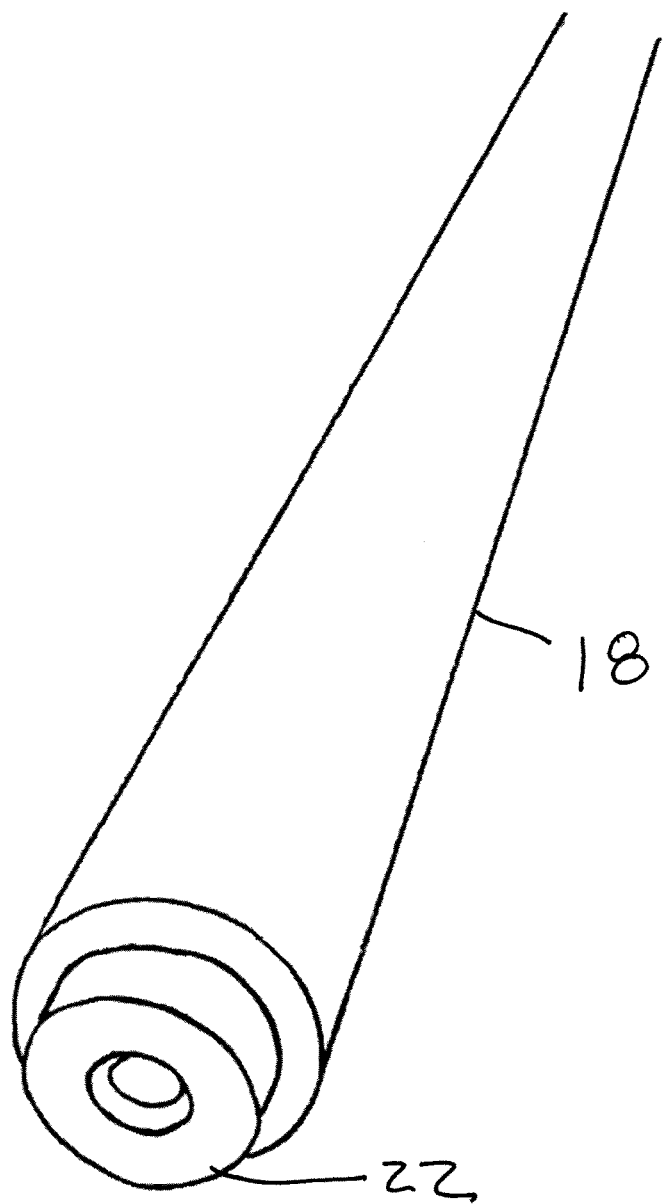
FIG. 2 is a perspective view of a base section according to the present invention.
Figure 3:
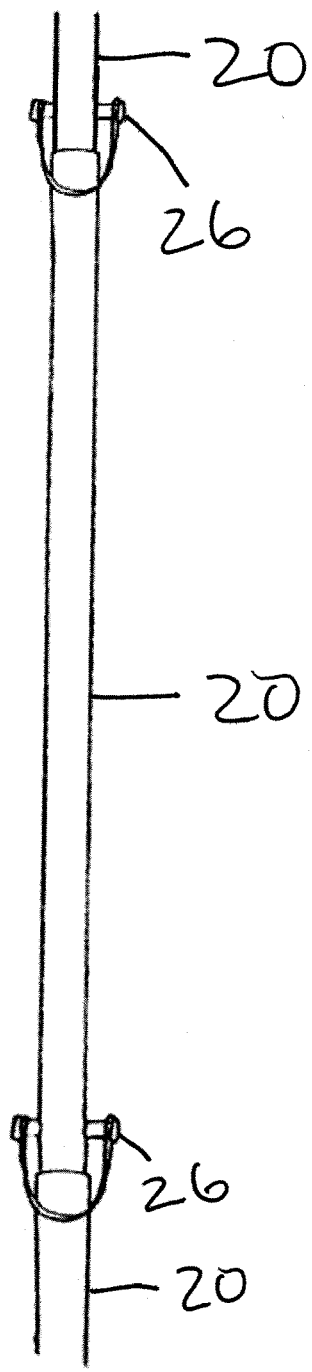
FIG. 3 is a perspective view of a pole according to the present invention.
Figure 4:
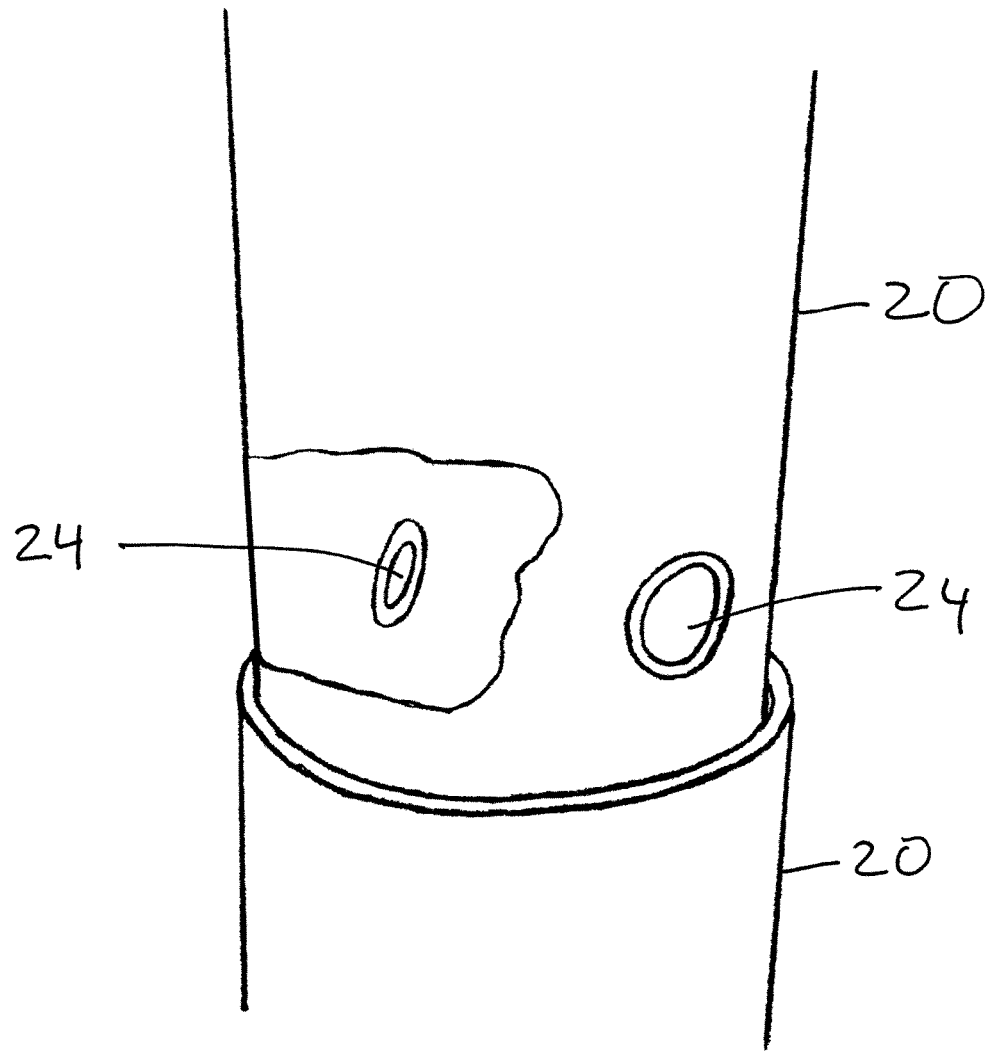
FIG. 4 is a perspective view of a pole according to the present invention.
Figure 5:
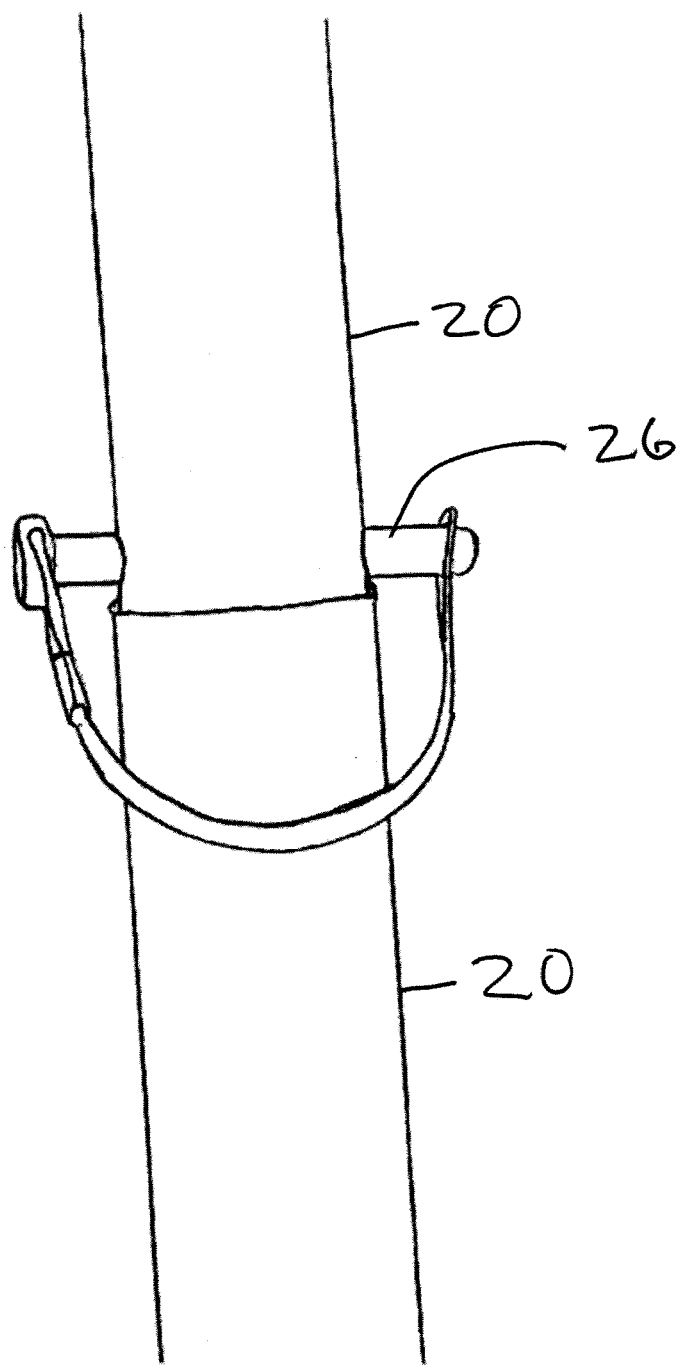
FIG. 5 is a perspective view of a pole according to the present invention.

The pole 12 includes a base section 18 with telescoping sections 20 contained in the base section 18, as shown in FIG. 1. On a ground end of the base section 18 is a support end 22 attached to the ground end 18 of the base section 18, as shown in FIG. 2. The support end 22 is rotatably attached to the ground end such that when the base section 18 is placed against the ground, the support end 22 supports the base section 18 from the ground and allows the base section 18 to rotate about the support end 22. Each telescoping section 20 of a smaller diameter fits into a lower telescoping section 20 of a larger diameter, as shown in FIG. 3. Each telescoping section 20 is tapered larger in diameter at a lower end to smaller in diameter at an upper end, so as each telescoping section 20 tightens against the telescoping section 20 it is within as it is extended upward. Each telescoping section 20 includes aligned pin holes 24 near the lower end to receive a pin 26, as shown in FIG. 4. As shown in FIG. 5, the pin 26 is used to prevent each telescoping section 20 from falling downward once extended.

Figure 6:
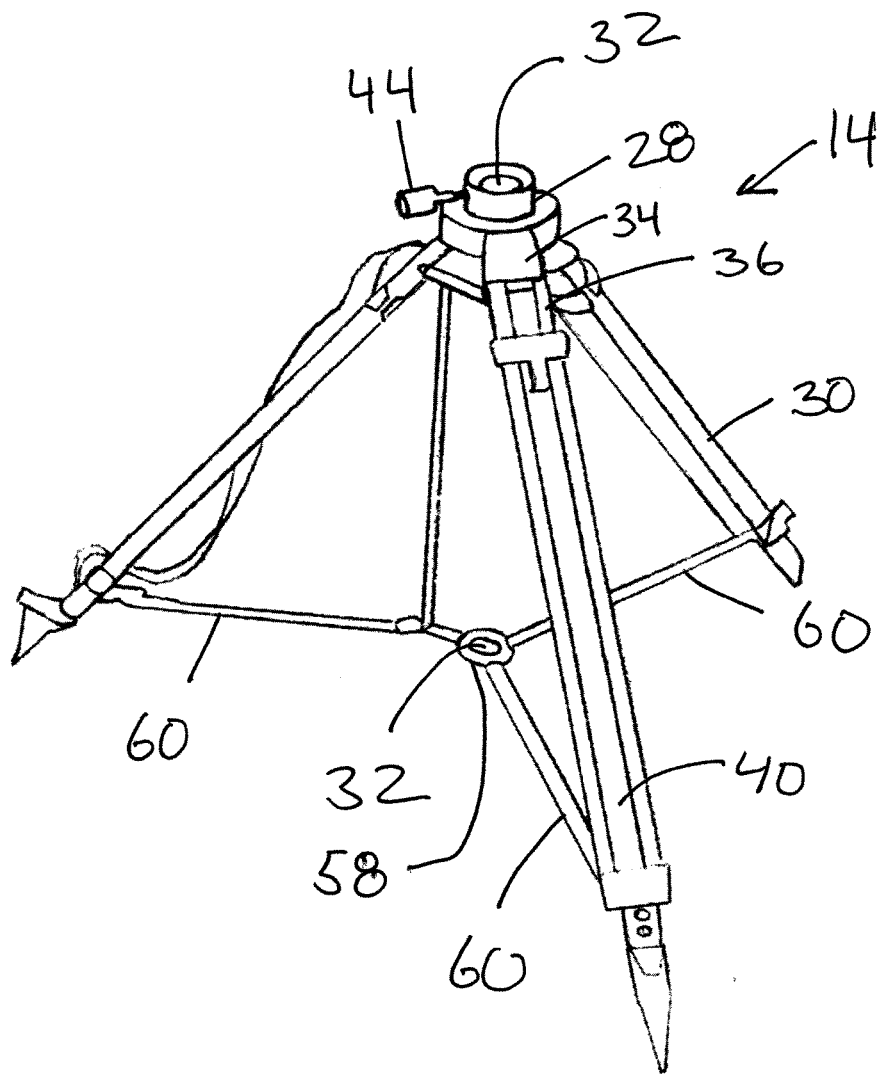
FIG. 6 is a perspective view of a stand according to the present invention.
Figure 7:
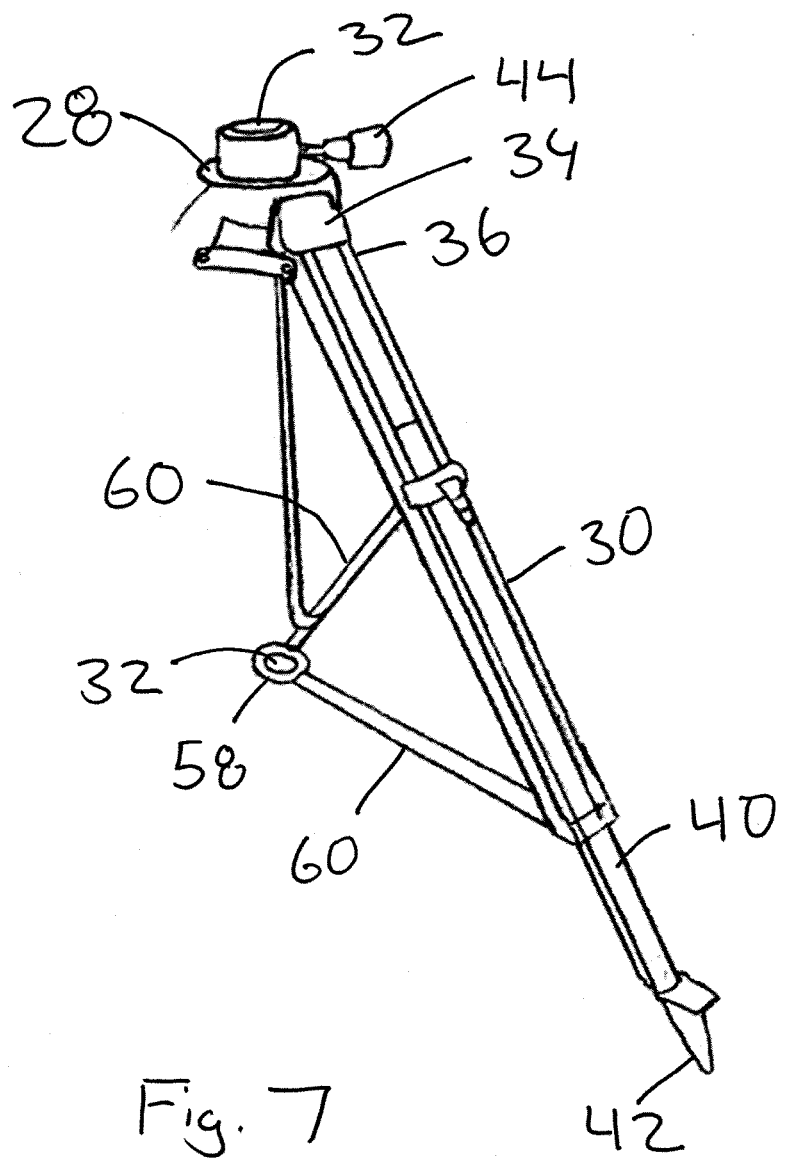
FIG. 7 is a perspective view of a stand according to the present invention.

The stand 14 is shown as a tripod in FIGS. 1 and 6-7. The tripod includes a head 28, adjustable legs 30 and pole stabilizer. The head 28 includes a pole opening 32 and three leg mounts 34. The leg mounts 34 accept a mount end 36 of each leg 30. Each first end of the legs 30 mounts to the head 28 using fasteners to allow the leg 30 to rotate about the mount point of each leg 30 to the head 28. The legs 30 can be rotated out to use the stand 14 as shown or rotated inward toward each other to fold up the stand 14. The legs 30 adjust in length buy releasing a leg lock 38 and moving a center section 40 of the leg 30 outward to desired length, then engaging the leg lock 38 to lock center section 40 in place, as shown in FIG. 7. The center section 40 of each leg 30 includes a pointed end 42 to allow for the pointed end 42 to be embedded into the ground.

Figure 8:
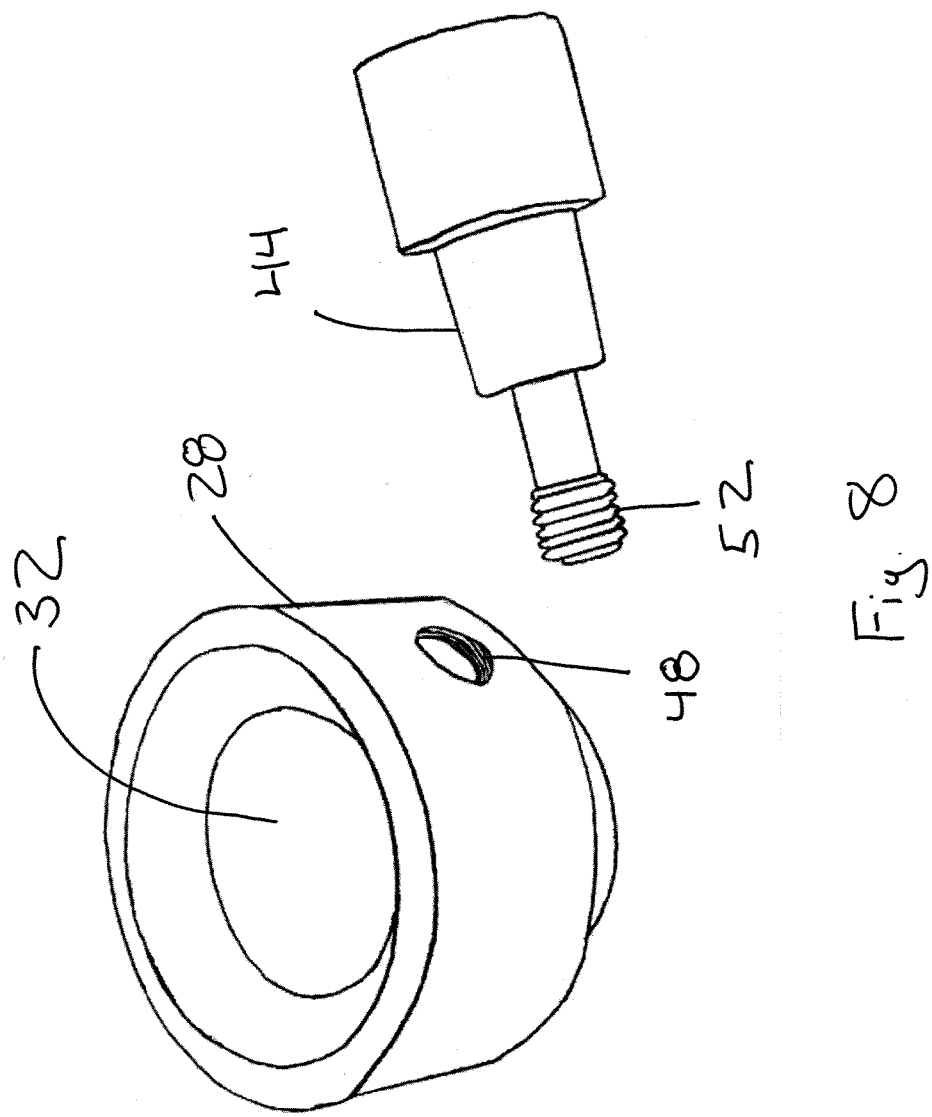
FIG. 8 is a perspective view of a head according to the present invention.
Figure 9:
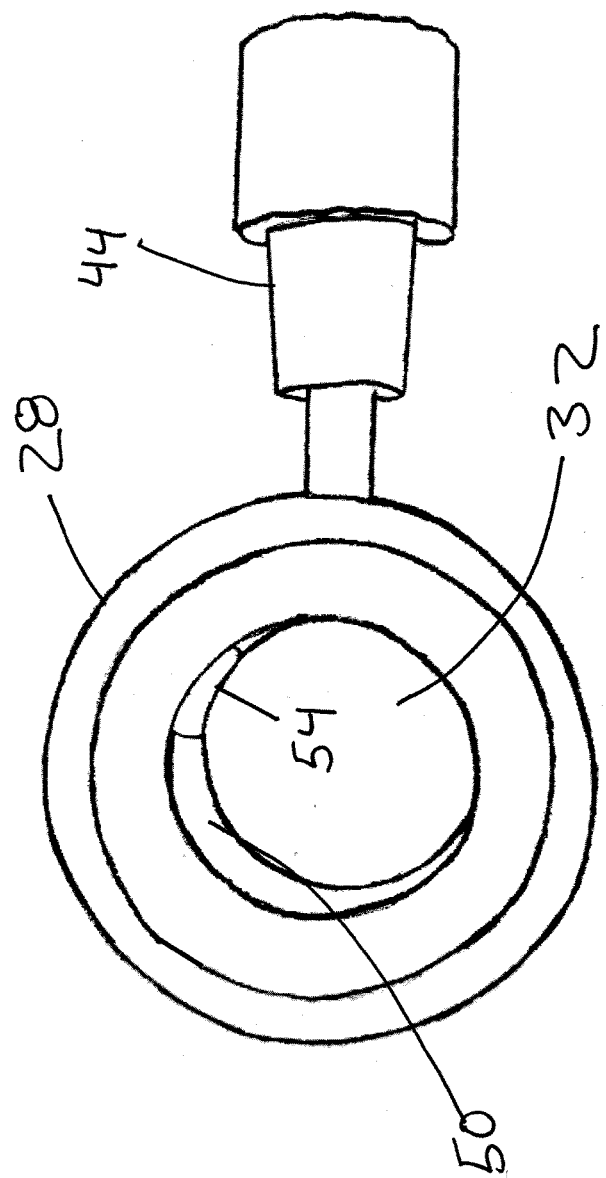
FIG. 9 is a perspective view of a head according to the present invention.
Figure 10:
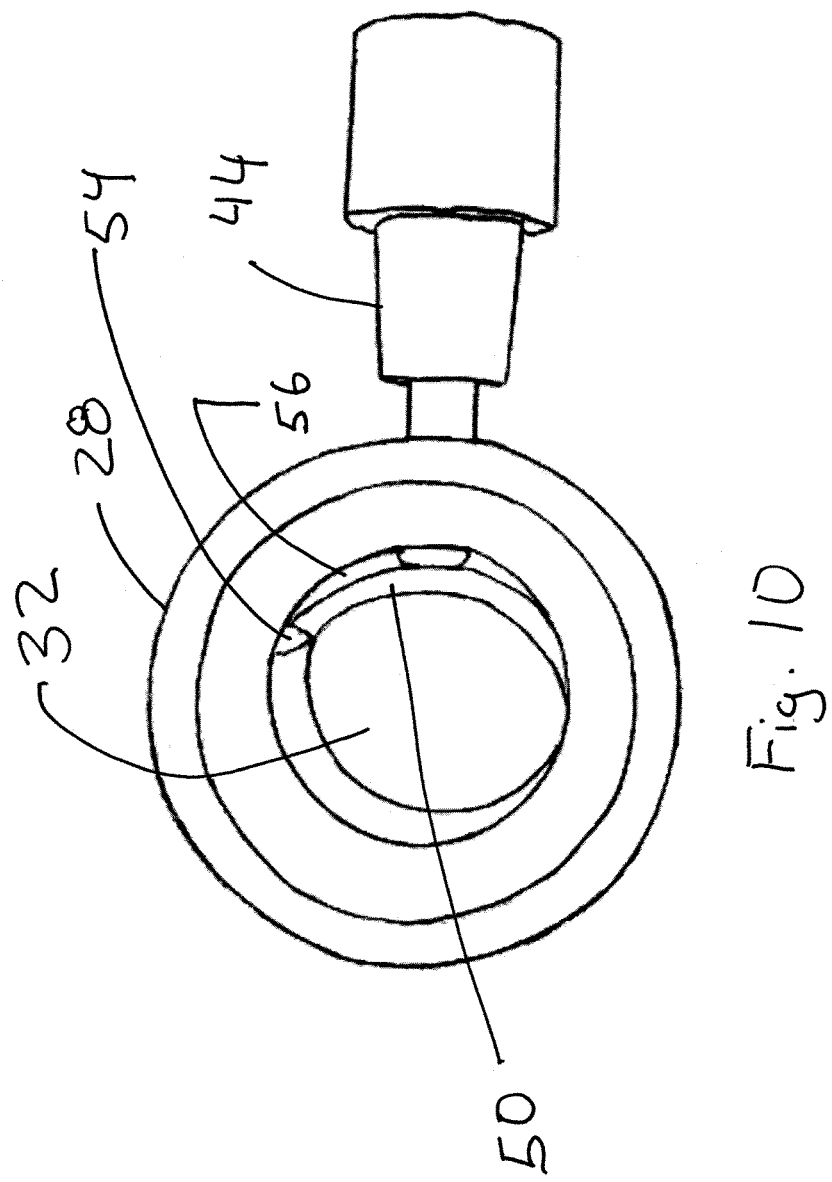
FIG. 10 is a perspective view of a head according to the present invention.
Figure 11:
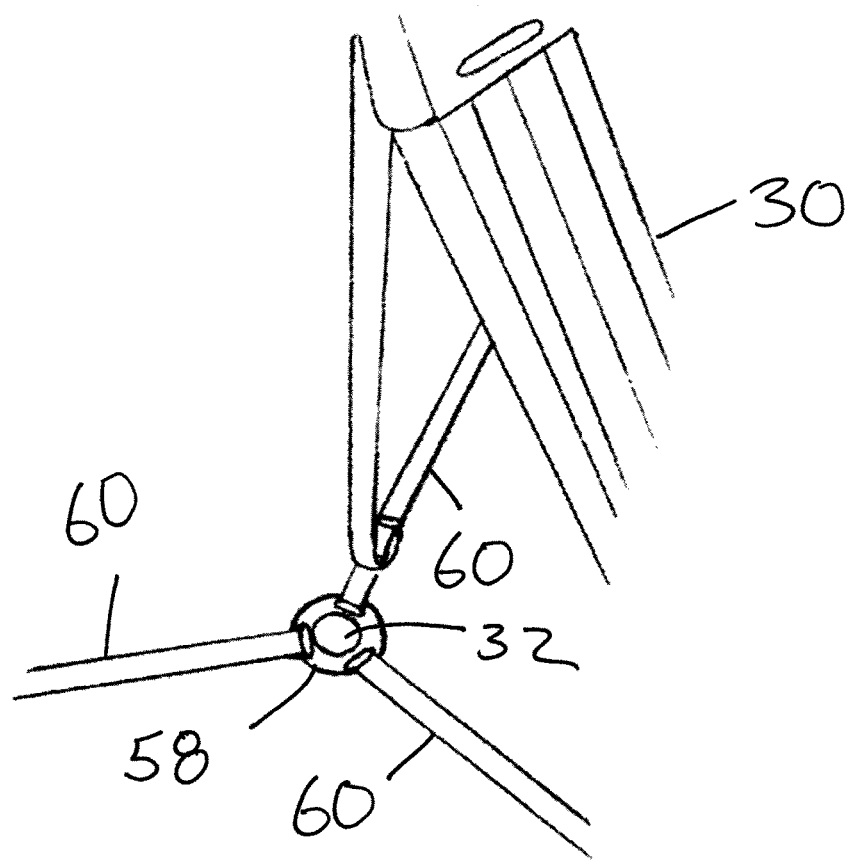
FIG. 11 is a perspective view of a pole stabilizer according to the present invention.
Figure 12:
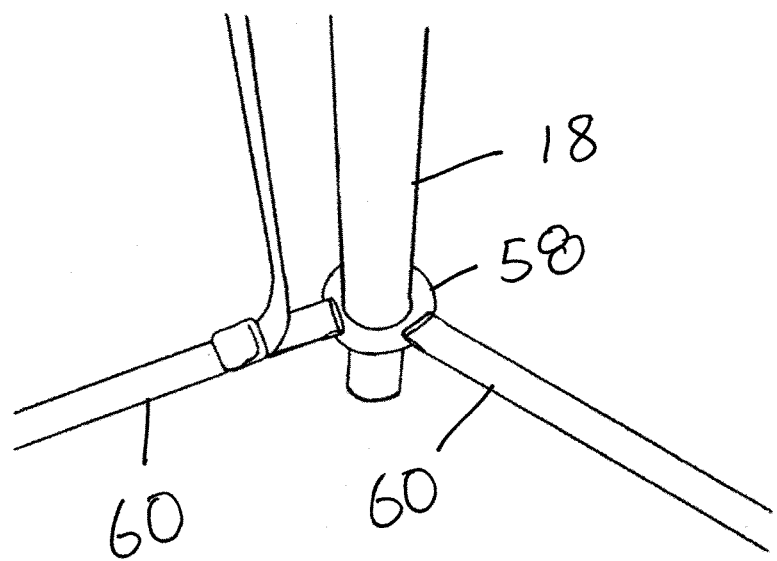
FIG. 12 is a perspective view of a pole stabilizer according to the present invention.

The head 28 includes a compression lock assembly internally about the pole opening 32, as shown in FIGS. 8-10. The compression lock assembly incudes a handle 44, screw hole 48 in the head 28 and compression ring 50, as shown in FIG. 8. The handle 44 has a threaded end 52 to screw into threads in the screw hole 48. The screw hole 48 leads to the pole opening 32 in the head 28. The compression ring 50 is a split ring at a split 54 shown in FIGS. 9-10. One end 56 of the split ring is positioned near the screw hole 48. The base section 18 of the pole 12 is placed into the pole opening 32 until the support end 22 of the base section 18 touches the ground. After the pole 12 is inserted into the pole opening 32, the handle 44 is screw inward so that the threaded end 52 pushes the split ring outward, as shown in FIG. 10 without the pole 12. The split ring applies pressure against the base section 18 and holds the base section 18 in place. Applying the right amount of pressure allows the base section 18 to be held in place, yet the base section 18 can be rotated within the pole opening 32 with enough pressure by the user on the base section 18. The pole stabilizer includes a pole ring 58 with straps 60, as shown in FIGS. 6-7 and 11-12. Each strap 60 is connected between the pole ring 58 and one of the legs 30. The pole ring 58 includes a pole opening 32 to receive the base section 18 of the pole 12 after the base section 18 is inserted into the pole opening 32 of the head 28. The pole stabilizer is a second point to hold the pole 12 in a vertical position, when the legs 30 are spread and the straps 60 pull against the pole ring 58.

Figure 13:
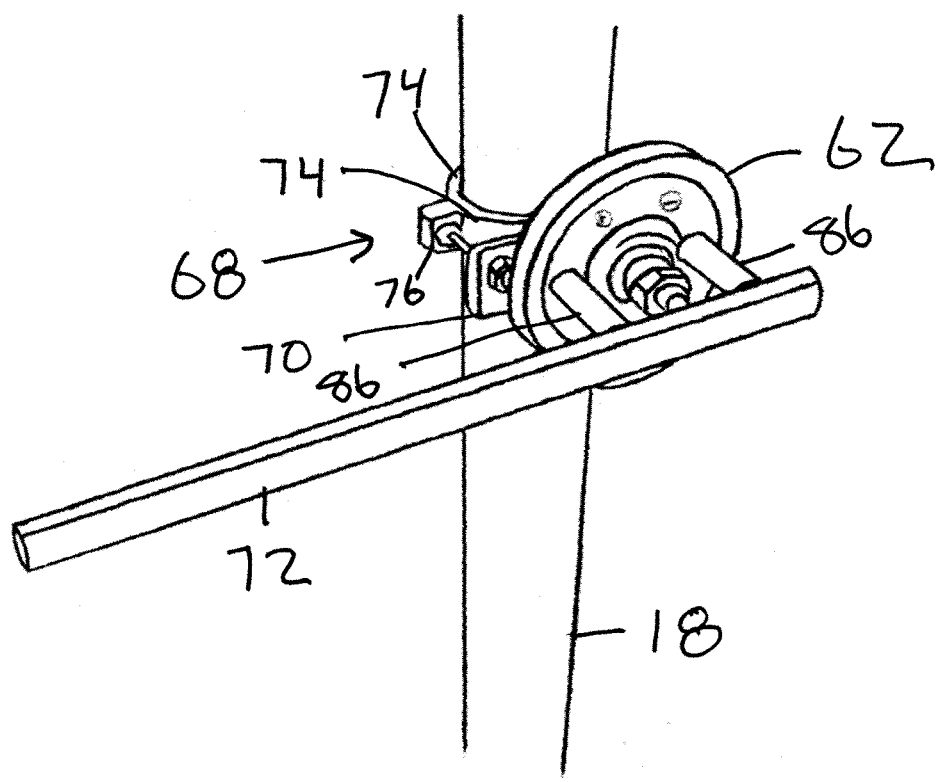
FIG. 13 is a perspective view of a lower pulley according to the present invention.
Figure 14:
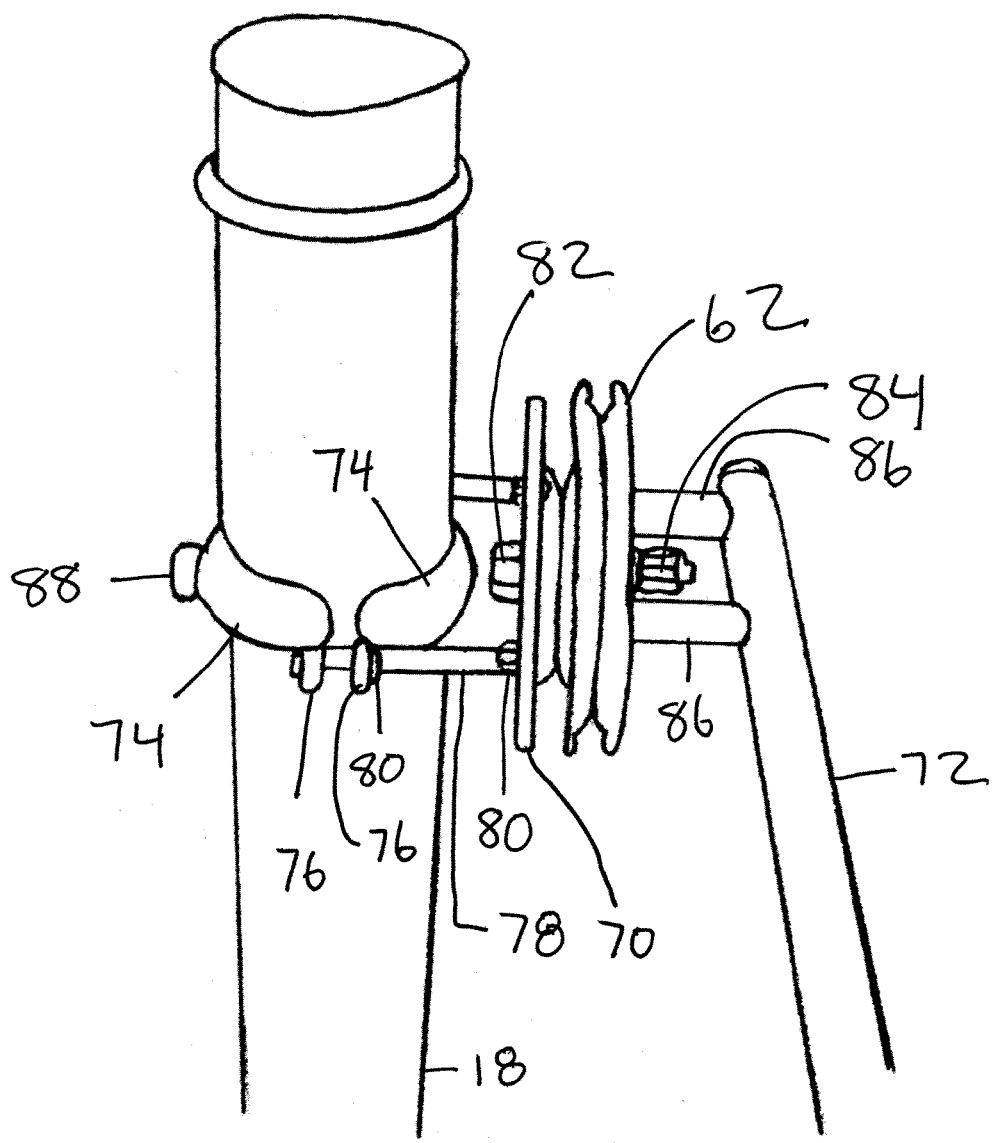
FIG. 14 is a perspective view of a lower pulley according to the present invention.
Figure 15:
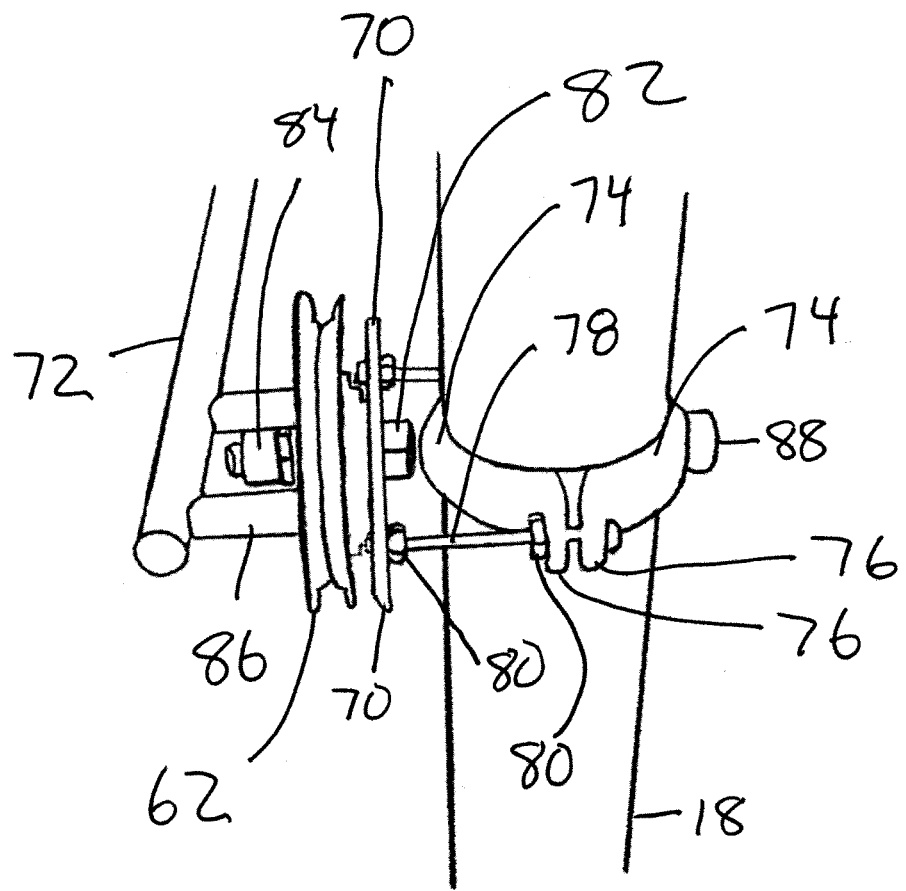
FIG. 15 is a perspective view of a lower pulley according to the present invention.
Figure 16:
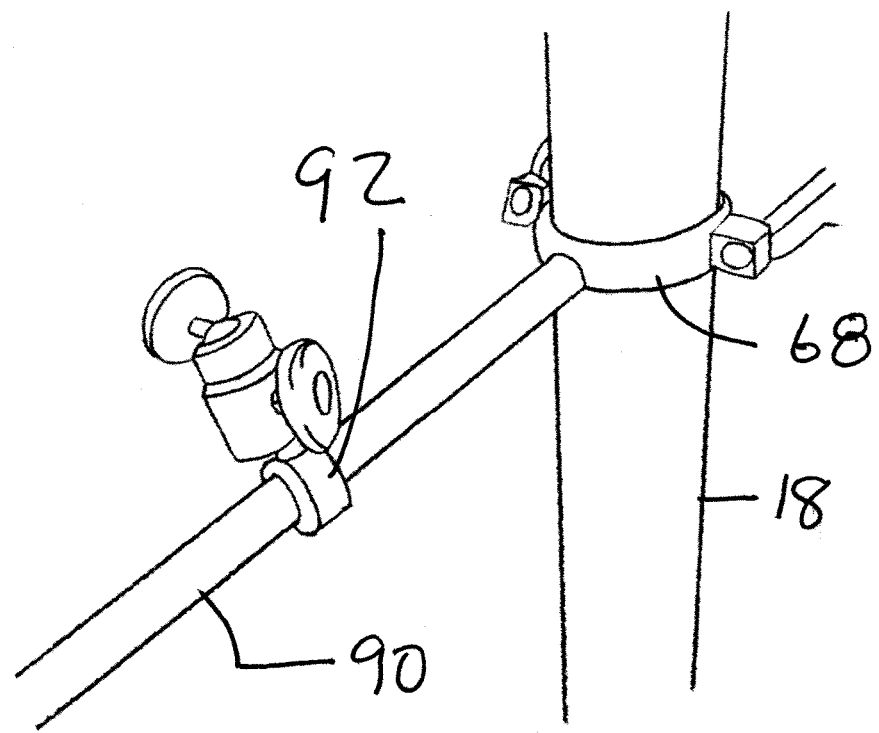
FIG. 16 is a perspective view of a monitor shaft according to the present invention.

The camera control assembly includes a lower pulley 62, lower pulley attachment assembly, upper pulley 64, upper pulley attachment assembly and an adjustable cable 66. The lower pulley assembly includes a collar 68, lower pulley plate 70 and handle 72, as shown in FIGS. 13-15. The collar 68 includes two half circular clamp halves 74 which clamp around the base section 18 of the pole 12. Each clamp half 74 includes two ends 76 with bolt holes. Two bolts 78 are used to fasten the clamp halves 74 together at the ends 76. Nuts 80 are used to secure the clamp halves 74 together. The bolts 78 are long enough to extend beyond the base section 18 and allow attachment of the lower pulley plate 70 using nuts 80 on both sides of the lower pulley plate 70. The lower pulley 62 is rotatably attached to the lower pulley plate 70 using a bolt 82 and nut 84. The handle 72 is attached to the lower pulley 62. Two spacers 86 are used in fastening the handle 72 to the lower pulley 62 to allow for clearance of the handle 72 from the lower pulley 62. The clamp half 74 opposite the attachment of the lower pulley 62 includes a threaded hole 88 to receive a monitor mount shaft 90, as shown in FIGS. 14-16. FIG. 16 shows the monitor mount shaft 90 with a monitor mount 92 attached to the monitor mount shaft 90.

Figure 17:
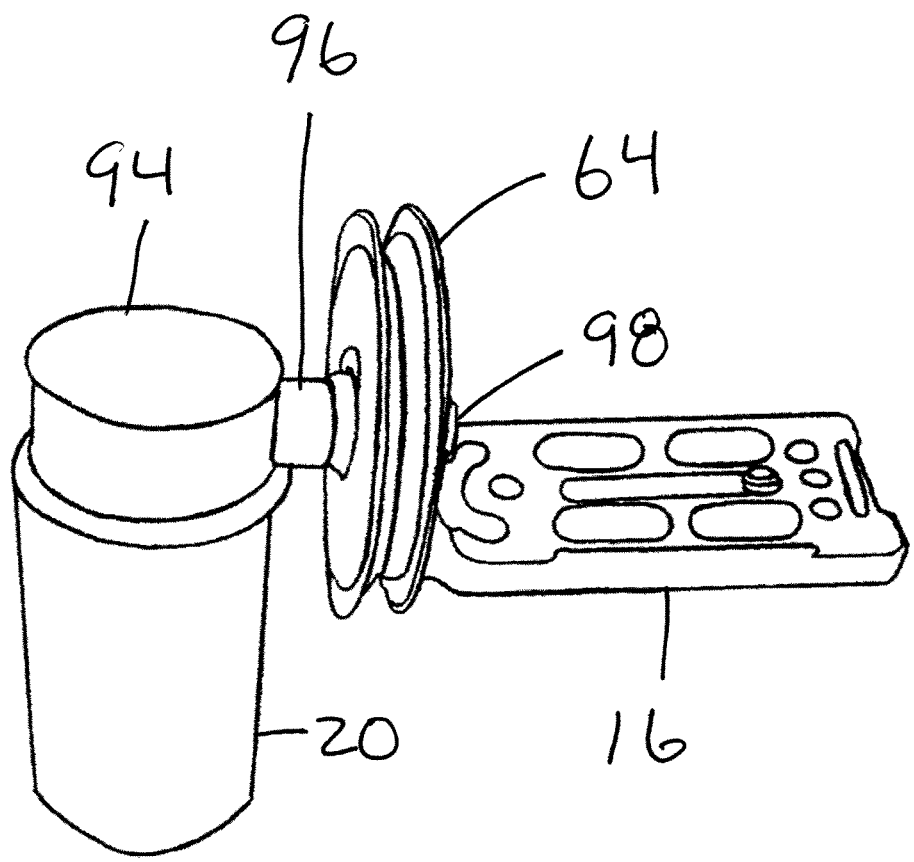
FIG. 17 is a perspective view of an upper pulley according to the present invention.
Figure 18:
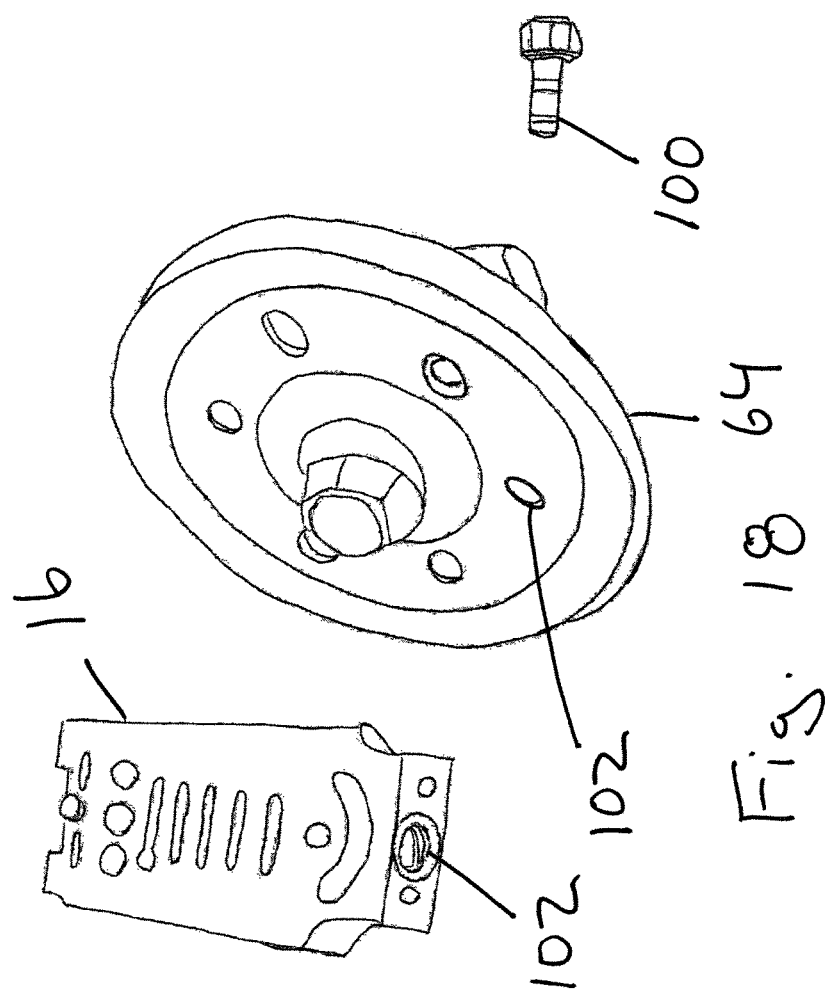
FIG. 18 is a perspective view of an upper pulley according to the present invention.

The upper pulley attachment assembly includes a pole cap 94, bolt spacer 96 and bolt 98, as shown in FIG. 17. The pole cap 94 mounts to the final telescoping section 20 that reaches the highest point. The upper pulley 64 is attached the pole cap 94 using the bolt 98 and spacer 96. Where the bolt 98 threads into pole cap 94 and the spacer 96 is between the pole cap 94 and upper pulley 64. The camera mount 16 is fastened to the upper pulley 64 using a bolt 100 that inserts into a hole 102 in the upper pulley 64 and threads into the camera mount 16, as shown in FIG. 18.

Figure 19:
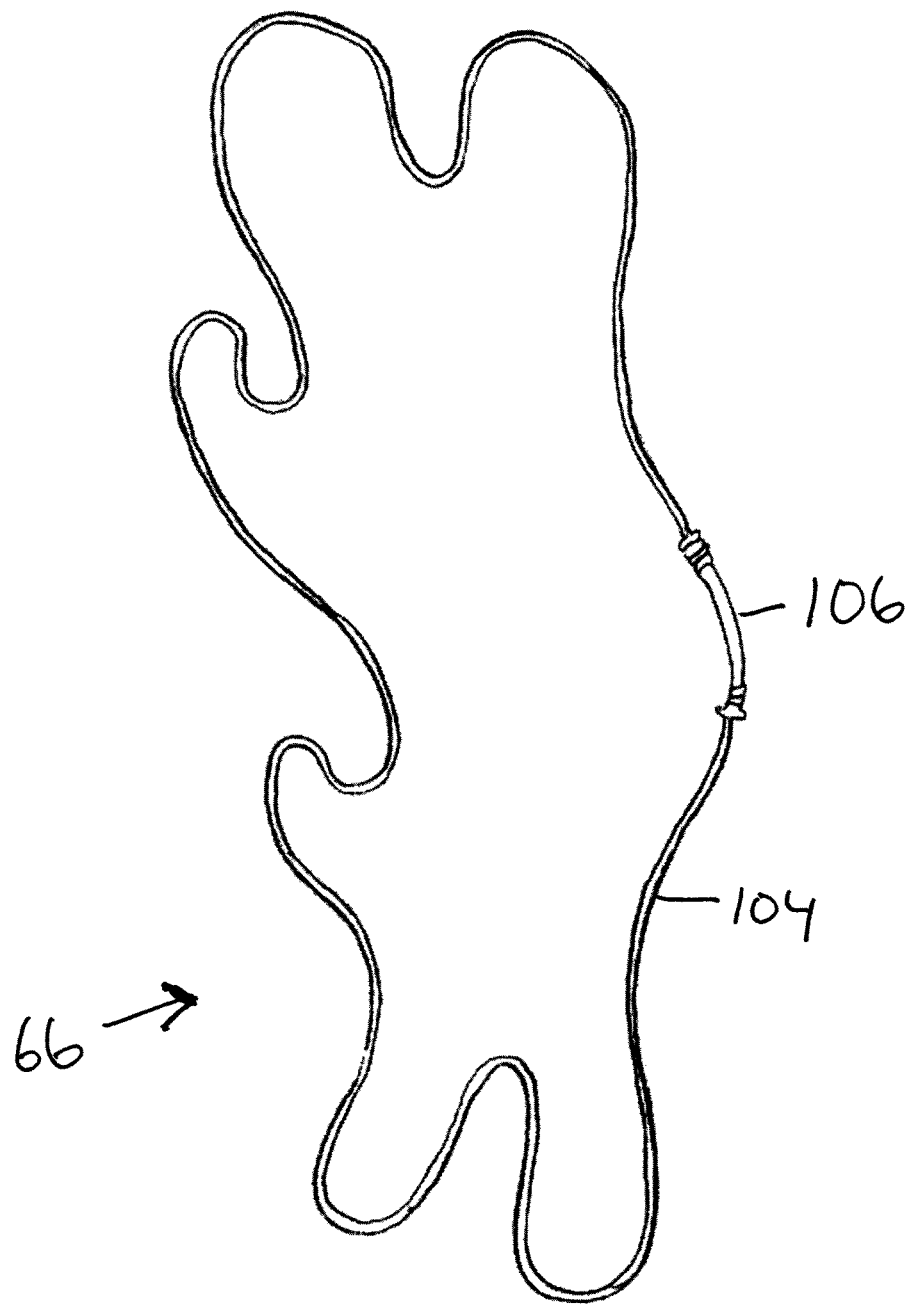
FIG. 19 is a perspective view of an adjustable cable according to the present invention.
Figure 20:
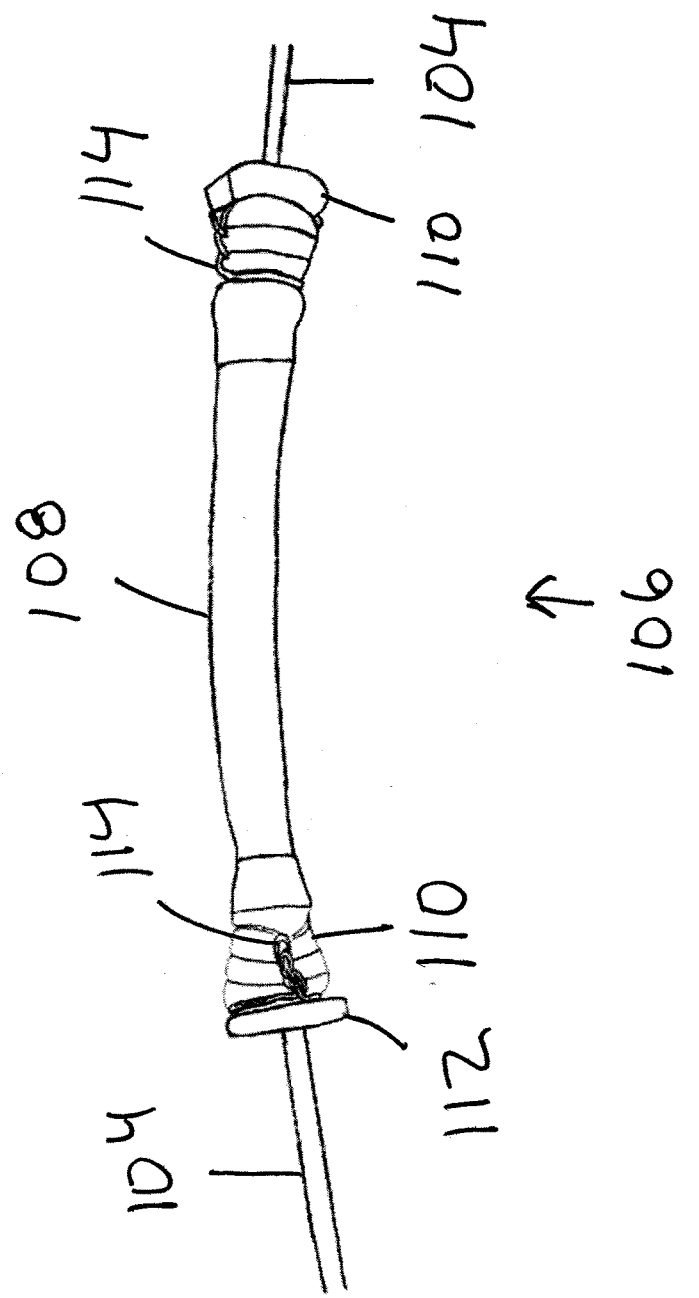
FIG. 20 is a perspective view of an adjustable cable according to the present invention.
Figure 21:
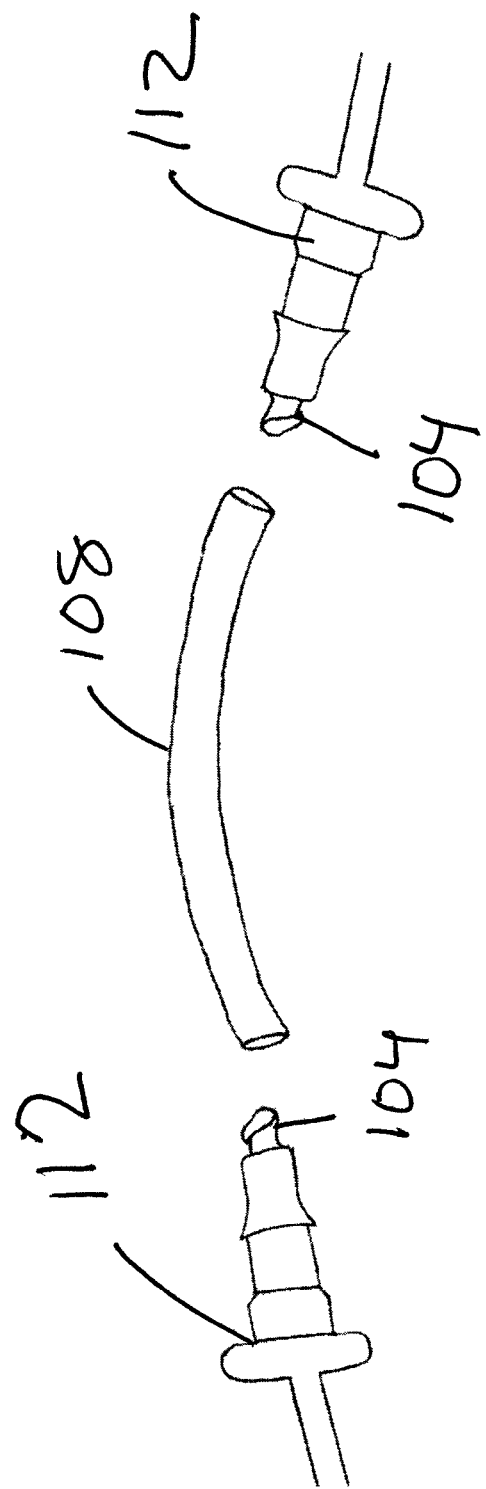
FIG. 21 is a perspective view of an adjustable cable according to the present invention.

FIG. 19 shows the adjustable cable 66. The adjustable cable 66 is a cable 104 with a flexible section 106. The flexible section 106 allows the length of the cable 104 to be changed, when needed for assembly and disassembly of the camera pole assembly 10. FIGS. 20-21 show a close up of the flexible section 106. The main body 108 of the flexible section 106 is of an elastic material to allow the flexible section 106 to be stretched in length when pulled at the ends 110 and retract to its original length when the ends 110 are released. FIG. 21 shows the main body 108 as an elastic tube. The cable 104 has two plug ends 112 which plug into the ends of the main body 108. The plug ends 112 are a plug on the end of cable 104. The plug ends 112 are secured in the main body 108 using a wire tie 114 on the outside of the ends 110 of the main body 104.

Figure 22:
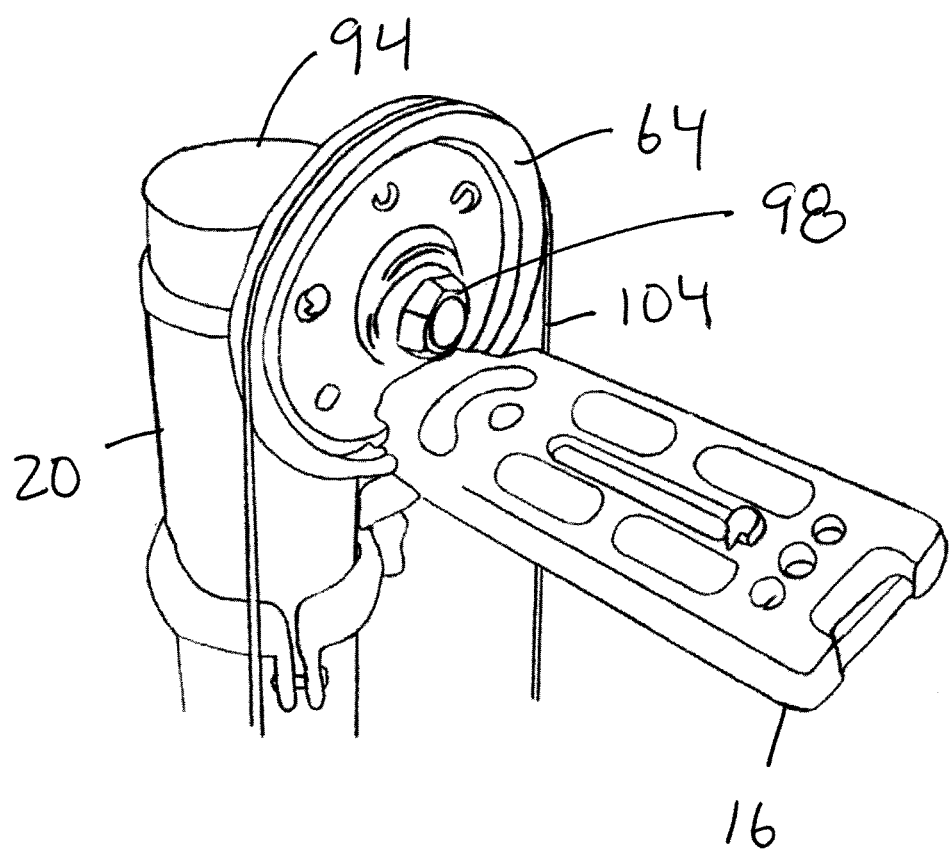
FIG. 22 is a perspective view of an upper pulley cable according to the present invention.
Figure 23:
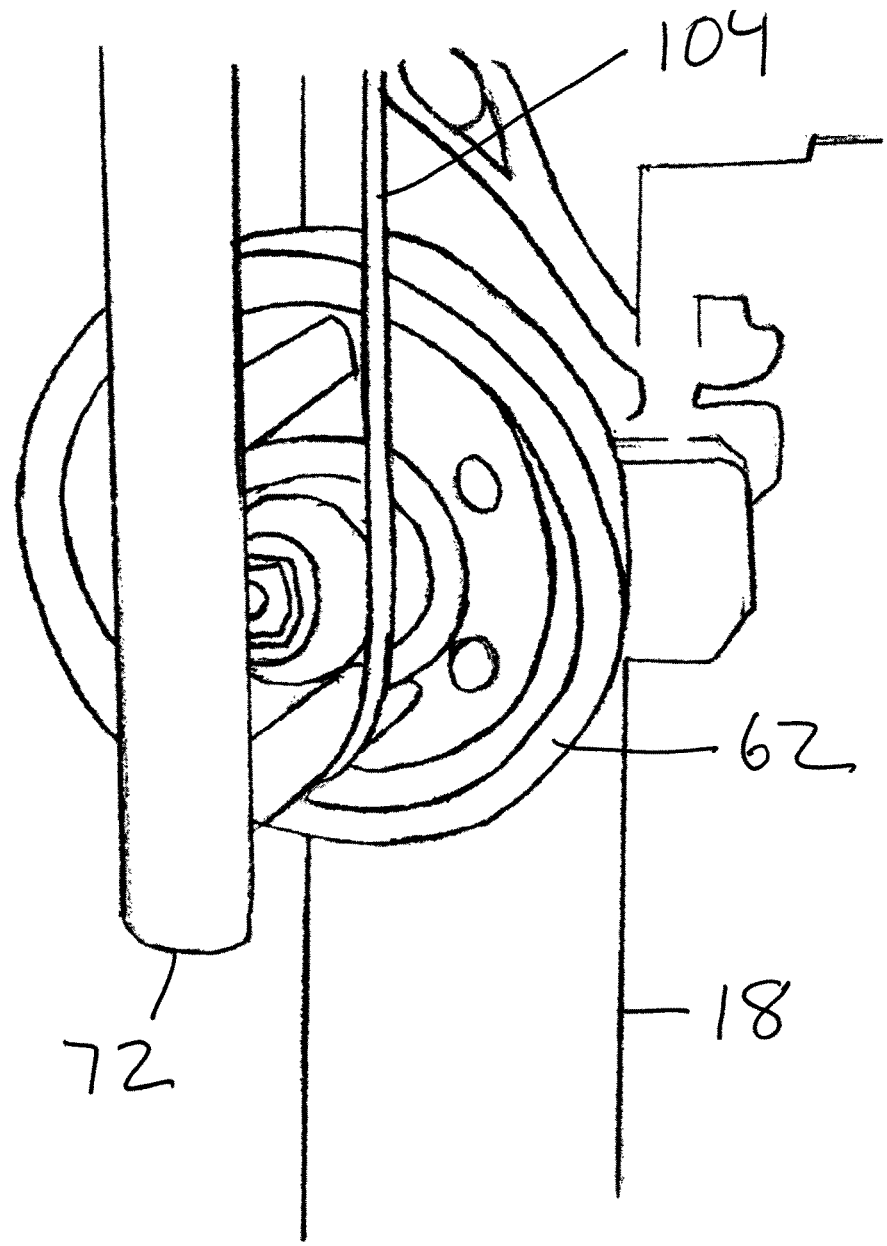
FIG. 23 is a perspective view of a lower pulley according to the present invention.
Figure 24:
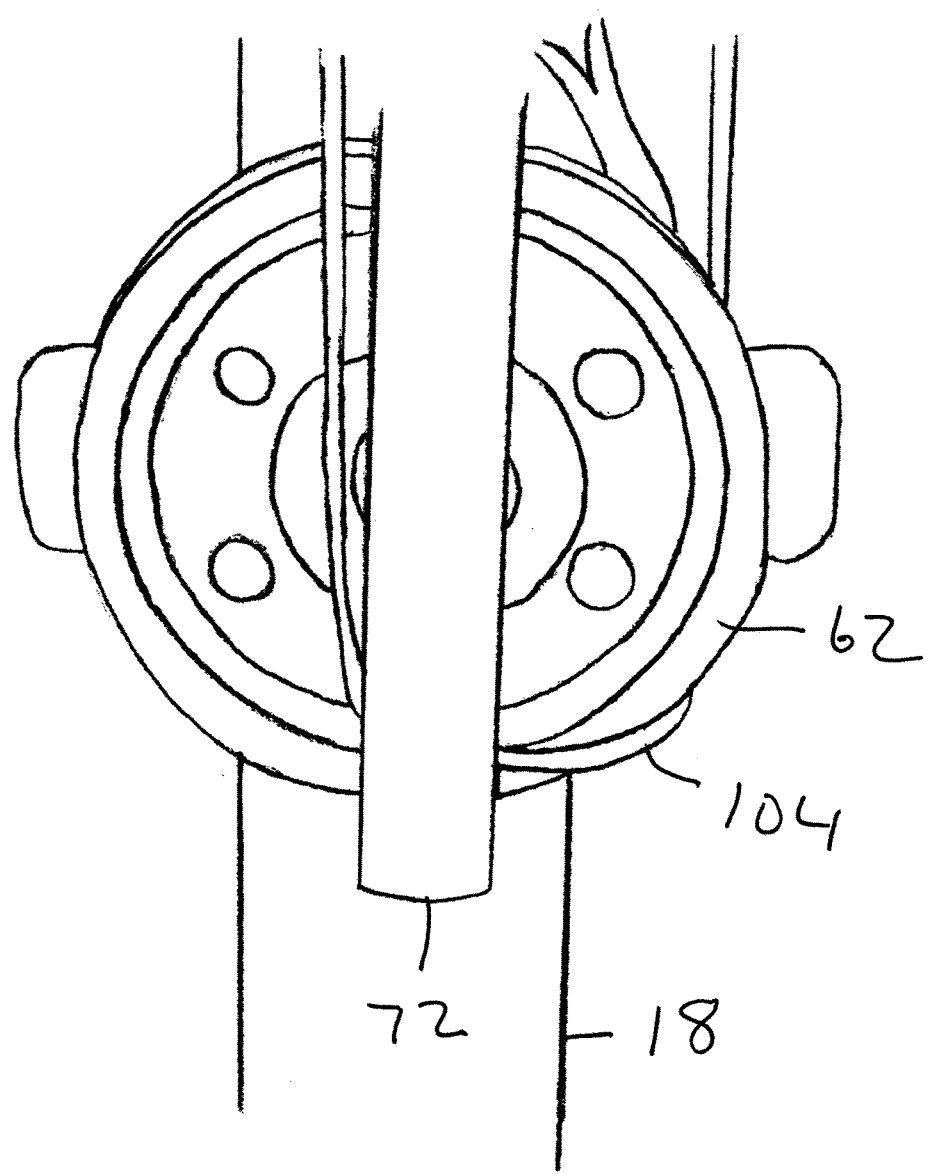
FIG. 24 is a perspective view of a lower pulley according to the present invention.
Figure 25:
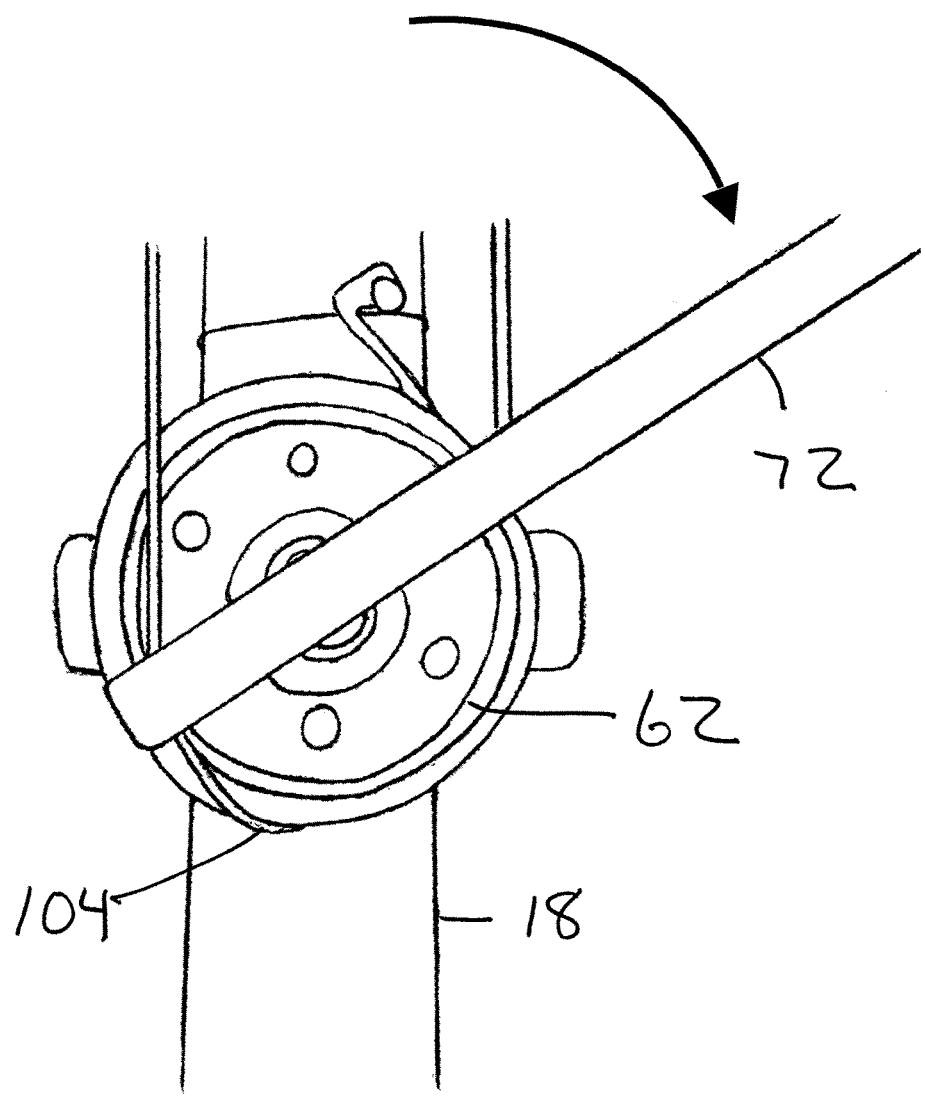
FIG. 25 is a perspective view of a lower pulley according to the present invention.

To assemble the camera pole assembly 10 for use, first the stand 14 must be set up to receive the pole 12. The stand 14 is shown as a tripod with foldable legs 30, where the pointed ends 42 are typically folded toward the center and against each other when stored. To set up the stand 14, the legs 30 are spread apart till the straps 60 are fully extended to center the pole ring 58 under the pole opening 32 of the head 28, as shown in FIGS. 1 and 6. The base section 18 of the pole 12 is inserted into the pole openings 32 of the head 28 and the pole ring 58. The handle 44 of the compression assembly is screwed in until the split ring applies pressure and holds the pole 12. The pole 12 already has the components of the camera control assembly attached to the pole 12, except for the adjustable cable 66. Before the pole 12 is raised, the adjustable cable 66 is drape around the upper pulley 64, as shown in FIG. 22. Then, the final telescoping section 20 is raised first and lock into place using the pin 26, as depicted in FIGS. 3 and 5. Each of the remaining telescoping sections 20 are raised and pined. Before the last telescoping sections 20 are raised, the adjustable cable 66 is placed over the handle 72 attached to the lower pulley 62, as shown in FIG. 23. Also, a camera 116 should be installed on the camera mount 16. Then, the cable 104 is laced over part of the lower pulley 62, as shown in FIG. 24. Finally, the handle 72 of the lower pulley 62 is rotated in the direction of the arrow to apply pressure and force the cable 104 around the entire lower pulley 62, as shown in FIG. 25. The applied pressure by rotating the handle 72 causes the adjustable cable 66 to stretch at the flexible section 106 and allows the adjustable cable 66 to be installed. Installing the adjustable cable 66 in this manner keeps the adjustable cable 66 under tension when installed, where the constant tension of the cable 104 due to the flexible section and friction between the cable 104 and the pulleys 62, 64 causes the cable 104 to rotate the upper pulley 64 when the lower pulley 62 rotates. When a camera 116 is on the camera mount 16, rotation of the handle 72 on the lower pulley 62 causes the camera 116 to be tilted and rotation of the base section 18 in the pole openings 32 causes the camera 116 to be panned. A monitor 118 wired to the camera 116, as shown in FIG. 1, can be mounted to the monitor mount 92 attached to the monitor mount shaft 90, to allow viewing of what is filmed.

While different embodiment of the invention have been described in detail herein, it will be appreciated by those skilled in the art that various modification and alternatives to embodiments could be developed in light of the overall teachings of the disclosure. Accordingly, the particular arrangements are illustrated only and are not limiting as to the scope of the invention that is to be given the full breadth of any and all equivalents thereof.

We claim:

1. A camera pole for elevating and controlling a camera, comprising:
    a pole, said pole having a base section and a least one telescoping section which extends from said base section, wherein a final telescoping section is a top section that is highest and said base section is closest to ground level;
    a stand to receive said pole and support said pole in a vertical position;
    a camera control assembly comprising:
    an upper pulley rotatably attached to said top section of said pole, said upper pulley mounted on outside of said top section of said pole;
    a lower pulley rotatably attached to said pole near said base section said lower pulley mounted on outside of said pole;
    a cable about said upper pulley and said lower pulley,
    an adjustable section as part of said cable, where the length of said cable can adjusted using said adjustable section to allow installation of said cable in the field, wherein said adjustable section is an elastic material between two ends of said cable; and
    a handle attached to said lower pulley to manually rotate said lower pulley, thereby rotating said upper pulley; and
    a camera mount for holding a camera, said camera mount attached to said upper pulley.

2. The camera pole of claim 1, wherein said adjustable section is an elastic tube between two ends of said cable.

3. A method of assembling a camera pole assembly for use, comprising:
    spreading legs of a stand until straps of a pole stabilizer are fully extended to center a pole ring under a pole opening of a head of the stand;
    inserting a base section of a pole into the pole openings of the head and the pole ring;
    screwing a components of a compression lock in the head until the compression lock applies pressure and holds the pole while allowing rotation of the pole in the opening;
    draping an adjustable cable on an upper pulley with a camera mount, where the upper pulley is mounted to an outside of the pole and where the adjustable cable includes an adjustable section as part of the cable, where the length of the cable can adjusted using the adjustable section to allow installation of said cable in the field;
    raising telescoping sections of the pole, while placing the adjustable cable over a handle attached to a lower pulley; and
    lacing the adjustable cable over part of the lower pulley while applying pressure and forcing the adjustable cable around the entire lower pulley, where the lower pulley is mounted to an outside of the pole.

4. A camera pole for elevating and controlling a camera, comprising:
    a pole, said pole having a base section and a least one telescoping section which extends from said base section, wherein a final telescoping section is a top section that is highest and said base section is closest to ground level;
    a stand to receive said pole and support said pole in a vertical position;
    a camera control assembly consisting of:
    an upper pulley rotatably attached to said top section of said pole, said upper pulley mounted on outside of said top section of said pole;
    a lower pulley rotatably attached to said pole near said base section said lower pulley mounted on outside of said pole;
    a single cable having a first end and a second end, said cable wrapped about said upper pulley and said lower pulley,
    an adjustable section as part of said cable mounted between said first end and said second end of said cable, where the length of said cable can adjusted using said adjustable section to allow installation of said cable in the field; and
    a handle attached to said lower pulley to manually rotate said lower pulley, thereby rotating said upper pulley; and
    a camera mount for holding a camera, said camera mount attached to said upper pulley.

5. The camera pole of claim 4, further including a pin for each of said least one telescoping section to prevent each of said least one telescoping section from descending when extended; wherein each of said least one telescoping section has a top and bottom, wherein each of said least one telescoping section has a through hole to receive said pin.

6. The camera pole of claim 4, wherein said stand includes a head with a pole opening to receive said base section of said pole, wherein said head includes a compression lock assembly to secure said base section of said pole with tension to hold said pole while allowing said pole to rotate within said pole opening.

7. The camera pole of claim 6, further including a pole stabilizer, said pole stabilizer including a pole ring with straps, said straps connected between said pole ring and legs of said stand, and said pole ring including a pole opening to receive said base section of said pole after said base section is inserted into said pole opening of said head.

8. The camera pole of claim 7, wherein said collar includes two half circular clamp halves which clamp around said the base section of the pole, wherein each of said clamp halves includes two ends with bolt holes, wherein two bolts fasten said the clamp halves together at said two ends, wherein said bolts are long enough to extend beyond said base section and allow attachment of a lower pulley plate and wherein said lower pulley is attached to said lower pulley plate.

9. The camera pole of claim 4, wherein said compression lock assembly is positioned internally about said pole opening, wherein said compression lock assembly incudes a handle, hole in said head to receive said handle and compression ring, wherein said compression ring is a split ring that can be pressured against said base section of said pole by said handle.

10. The camera pole of claim 4, wherein said adjustable section is a turnbuckle between two ends of said cable, wherein the length of said turnbuckle is manually adjustable.

11. The camera pole of claim 4, wherein said adjustable section is an elastic material between two ends of said cable.

12. The camera pole of claim 11, wherein said adjustable section is an elastic tube between two ends of said cable.

13. The camera pole of claim 4, further a collar mounted about said base section of said pole and wherein said lower pulley is mounted to said collar.

14. The camera pole of claim 13, wherein said collar includes two half circular clamp halves which clamp around said the base section of the pole, wherein each of said clamp halves includes two ends with bolt holes, wherein two bolts fasten said the clamp halves together at said two ends, wherein said bolts are long enough to extend beyond said base section and allow attachment of a lower pulley plate and wherein said lower pulley is attached to said lower pulley plate.

15. The camera pole of claim 14, wherein said collar includes a threaded hole to receive a monitor mount shaft and further including a monitor mount attached to said monitor mount shaft.

16. The camera pole of claim 13, wherein said collar includes a threaded hole to receive a monitor mount shaft and further including a monitor mount attached to said monitor mount shaft.

17. The camera pole of claim 13, wherein said adjustable section is an elastic material between two ends of said cable.

\* \* \* \* \*